Oct. 16, 1951  C. L. FARRAND  2,571,124
SPHYGMOMANOMETER

Filed Oct. 2, 1946  3 Sheets-Sheet 1

INVENTOR
*Clair L. Farrand*
BY
*Pennie, Edmonds, Morton & Barrows*
ATTORNEYS

Oct. 16, 1951  C. L. FARRAND  2,571,124
SPHYGMOMANOMETER
Filed Oct. 2, 1946  3 Sheets-Sheet 3

INVENTOR
Clair L. Farrand
BY
Kuues, Edmonds, Morton & Barrows
ATTORNEYS

Patented Oct. 16, 1951

2,571,124

UNITED STATES PATENT OFFICE 2,571,124

SPHYGMOMANOMETER

Clair L. Farrand, Scarsdale, N. Y., assignor to Farrand Optical Co., Inc., a corporation of New York Application October 2, 1946, Serial No. 700,742

16 Claims. (Cl. 128—2.05)

This invention relates to an improved method and apparatus for automatically operating a sphygmomanometer so as to lower the pressure therein according to a known and reproducible function of time, and for simultaneously producing a permanent graphical representation of the character and amplitudes of the auscultatory sounds at the systolic and diastolic and intermediate pressures along a time axis calibrated in terms of the sphygmomanometer pressure.

The invention has for its principal object to provide a method and apparatus as described, wherein presently known types of sphygmomanometers and procedures may be employed without substantial change in the accepted technique of the auscultation method for determining the systolic and diastolic pressures, while at the same time obtaining a graphical record which will result in establishing an improved procedure in the measurement of blood pressure and the simultaneous graphical recording thereof.

The process of blood pressure measurement consists broadly in applying measured pressures to an artery of the subject. When the applied pressure is high enough to just keep the artery closed throughout the cardiac cycle, the pressure is considered to be a measure of the blood pressure existing within the artery at the peak of the cardiac cycle and is called the systolic pressure. Conversely, when the pressure applied is sufficient to close the artery only at the minimum pressure occurring during the cardiac cycle, the pressure so required is taken as a measure of the intra-arterial pressure at the minimum of the cardiac cycle and is called the diastolic pressure. In order to apply a measured and controllable pressure to the artery, use is made of a pneumatic bag or cuff customarily applied around a limb of the subject. The hydrostatic pressure existing within the pneumatic cuff may be conveniently measured by means of a mercury or aneroid manometer connected thereto. The pressure within the pneumatic cuff is initially raised to a value above systolic and then allowed to fall gradually through the systolic and diastolic values. In the sphygmomanometers heretofore used this fall of pressure is achieved by manual control of an escape valve to the pneumatic cuff. Manual control of this escape valve is inevitably somewhat erratic so that the fall of pressure is non-uniform and the variation of pressure with time will change from one blood pressure measurement to the next.

The art of blood pressure measurement consists in recognizing the instants at which the pressure in the pneumatic cuff has fallen to a level such that the artery just opens at systole and when the pressure has fallen to a value such that the artery just closes at diastole.

Passing the question of the relation of the hydrostatic pressure in the cuff to that truly existing within the artery, it may be said that the standard procedure is to measure the pressures within the cuff and to denominate these as blood pressures. The difficulty is that of recognizing when the cuff pressures pass through the critical point sufficient just to maintain the artery closed throughout the cardiac cycle and through the critical point sufficient to close the artery only at the minimum thereof.

In present practice the method most generally accepted for determining these systolic and diastolic pressures is that of auscultation. According to this method the systolic and diastolic pressures are determined from the sounds made by the blood in the artery as the artery is subjected to various degrees of compression. The sounds are heard by means of a stethoscope applied to the artery just below the cuff on the side away from the heart. The sounds produced during a fall of cuff pressure through the systolic and diastolic and intermediate values are various, to some degree peculiar to the subject and also influenced by the conditions of observation. As a result of experience a fairly general but not complete agreement has been arrived at upon the sounds which are to be taken as indicative of systolic and diastolic pressures. There remains, however, the very great difficulty in the auscultation method as practiced, that the diagnostician must make an instantaneous aural analysis of the sounds heard by him, and dividing his attention between the sounds heard in his stethoscope and the continually fluctuating indications of the manometer, he must make accurate decisions of the instants when the cuff pressure passes through the systolic and diastolic values and at the same time read the manometer pressures corresponding thereto.

The present invention is directed to a solution of this major difficulty inherent in the auscultation method. By means of my invention, I record graphically as a function of time the auscultatory sounds produced by or as concomitants of the different values of pressure occurring in the artery as the cuff pressure is varied by means of an automatically controlled escape valve through the range of systolic and diastolic levels. I link the escape valve to the recording mechanism so that each value of cuff pressure is uniquely referable to a single position of the recording stylus along the time axis of the graphical record. It is therefore possible to substitute a pressure axis for the time axis on the graphical record.

As a matter of convenience, in a preferred embodiment of the invention I record the auscultatory sounds as a linear function of time beginning at a cuff pressure above systolic, by causing a recording stylus to move with constant speed along the time axis of a record chart, and I employ a linkage relating cuff pressure to the position of the recording stylus along the time axis by a linear function so as to cause the cuff pressure to vary also according to a linear function of time. In this way it is possible to provide a linear calibration of the time axis of the record in units of cuff pressure. However, my invention contemplates that the linkage may be of any type and that the function relating cuff pressure to position of the recording stylus along the time axis of the record may be of any form so long as it is single-valued and determinate.

With a pressure axis substituted for the time axis, the diagnostician may read from the graphical record the blood pressures which occasioned, or which were associated with, the sounds there recorded. He may at his leisure pick out from the graphical record those amplitudes and oscillations which according to a standardized procedure are indicative of the systolic and diastolic and other intermediate pressures sought. The graphical recording of the auscultatory sounds, which is done basically in terms of amplitudes versus time, thus makes possible the establishment of objective criteria for systolic, diastolic and intermediate pressures.

By a suitable choice of filters in the amplifying system which is interposed between the stethoscope used to pick up the auscultatory sounds and the recording stylus, the graphical record may be made as simple or complex as desired, in order to select and to present so much of the auscultatory sounds as experience may show to be truly indicative of the systolic and diastolic and other desired pressures and to exclude undesired auscultatory sounds and other sounds due to random deviations attributable to the individual or to irregularities in technique.

In a preferred embodiment of my invention a rectifier is provided through which pass the amplified and filtered sounds before reaching the recording stylus. This rectifier is provided so that the stylus need trace only the envelope of the selected fraction of the auscultatory sounds, inasmuch as it is impractical to provide a stylus which can accurately follow the complex wave form of nonmusical sounds such as are here encountered.

For the purpose of determining systolic and diastolic pressures, the rate of travel of the recording stylus along the time axis of the graphical record may be conveniently made such that a record of all sounds produced during a single course of pressures extending from above the systolic to below the diastolic pressure will appear within a convenient short space upon the graphical record. With such a rate of travel for the recording stylus relative to the record chart, the envelope of sounds produced during a single pulse of the subject's circulatory system will appear essentially as a single peak or deflection of the stylus transverse to the time axis. It is a feature of my invention, however, that the rate of travel of the recording stylus relative to the record chart along the time axis thereof may be varied, with or without changing the time rate of cuff pressure, so that records may be made with a number of functions, preferably all linear, relating cuff pressure to position of the recording stylus relative to the record chart.

By raising the speed of travel of the recording stylus relative to the record chart, the auscultatory sounds may be spread out along the time axis of the graphical record so as to display in any desired degree of detail the shape of the envelope of the selected fraction of the auscultatory sounds at any desired phase of the range of cuff pressures between systolic and diastolic, thus providing additional features for diagnosis. Filters are conveniently employed to select the desired auscultatory sounds and exclude the undesired sounds, permitting observation of those sounds only which are significant.

My invention will be better understood by reference to the accompanying drawings in which.

Figure 1:
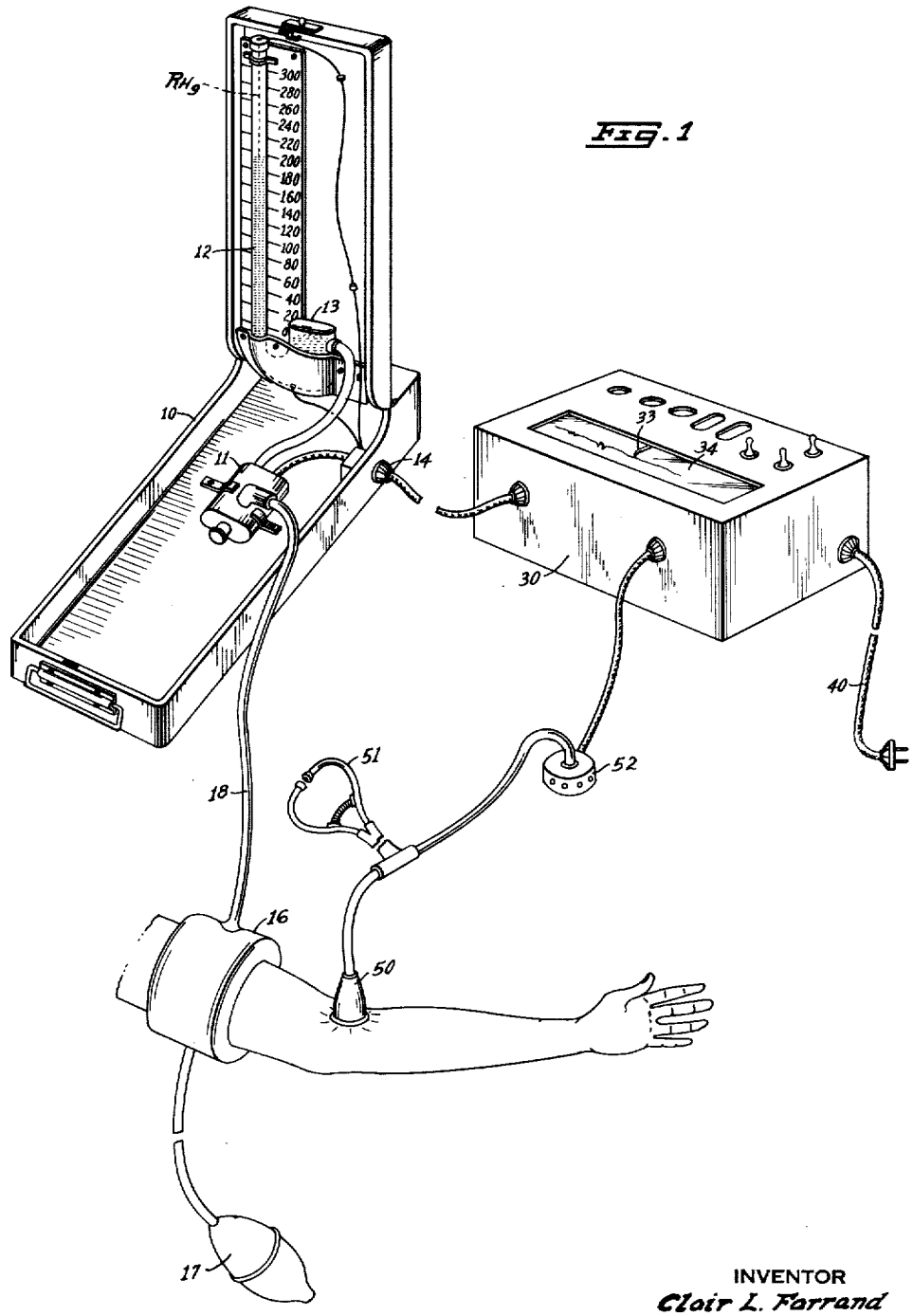
Fig. 1 represents the general arrangement of an apparatus operating in accordance with the method of my invention.

In Fig. 1, a sphygmomanometer 10 of the mercurial manometer type is fitted with an electrically operated escape valve 11 for reducing the pressure within the manometer 12. A resistance wire $R_{Hg}$ of a nonamalgamating material such as Nichrome or platinum extends down the bore of the manometer tube and electrical connection is made to its upper end through the top of the manometer tube and to its lower end by contact with the mercury in the reservoir 13, the lower end of the resistance wire being immersed in the mercury. A connector 14 is provided for connecting the electrically operated escape valve 11 and the ends of the resistance wire $R_{Hg}$ with the rest of the equipment. The sphygmomanometer includes a pneumatic bag or cuff 16 inflatable by means of a bulb 17 and connected to the manometer 12 by means of a flexible tube 18. A stethoscope 50 is provided with the usual binaural hearing tubes 51 and also terminates in a microphone 52 adapted to pick up the auscultatory sounds. The microphone 52 is connected by suitable leads to the recording unit 30 which contains power supply equipment, a drive motor to traverse a recording pen 33 relative to a recording chart 34, and filters and an amplifying and rectifying system to transform the auscultatory sounds into corresponding electrical pulses and thence to transverse vibrations of the recording pen 33. The recording unit 30 also contains the mechanism necessary to control the operation of the escape valve 11. Power to operate the entire system is derived from normal lighting circuits through a two-conductor cord 40.

Figure 2:
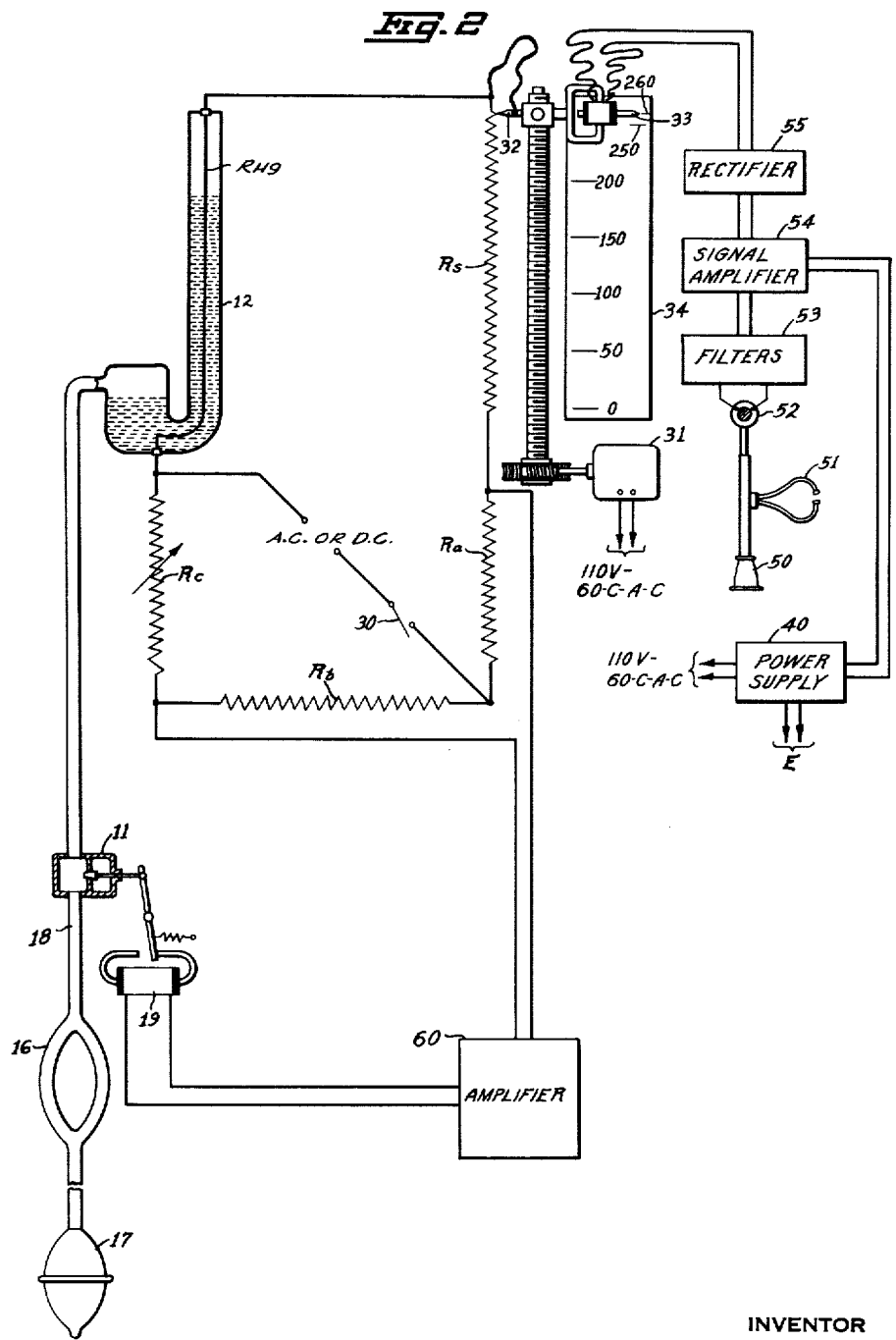
Fig. 2 is a schematic arrangement of the components thereof.

In Fig. 2 the elements of an apparatus operating in accordance with the method of my invention and constituting one embodiment thereof are schematically arranged as follows: A time axis motor 31, preferably of the synchronous type, drives an electrical contact 32 through suitable mechanism over a resistor $R_s$. This resistor $R_s$ consists of a potentiometer whose movable arm constitutes the contact 32. The resistor $R_{Hg}$ immersed in the mercury column of the manometer 12 is connected in series with $R_s$ and the two form one leg of a Wheatstone bridge. A portion of $R_{Hg}$ is short-circuited according to the height of the mercury column within the tube. Similarly the contact 32 is short-circuited to one end of the resistor $R_s$. Hereinafter $R_{Hg}$ and $R_s$ are used to indicate the effective resistances between their terminals, i. e. the value of the fractions thereof which are not short-circuited. An adjacent leg of the Wheatstone bridge is formed by an adjustable resistor $R_c$. The third and fourth legs of the bridge are formed by ratio arm resistors $R_a$ and $R_b$. The carriage carrying the contact 32 along the resistor $R_s$ is mechanically linked to a recording pen 33 and carries this pen along a chart 34 calibrated in millimeters of mercury. The mechanical linkage between the contact 32 and the pen 33 may be direct or it may be through a gear train or other linkage of known type so as to provide any desired relation between the movement of the contact 32 along the resistor $R_s$ and the movement of the pen 33 along the time axis of the record chart 34. The pen is supplied with rectified signals derived from the stethoscope 50, the microphone 52 and passing through the filters 53, amplifier 54, and rectifier 55.

To take a blood pressure record the recording pen 33 is set at the 260 mm. mark on the recording chart 34. With the pen in this position $R_s$ has its maximum value, the contact 32 which is mechanically linked with the recording pen 33 being at the end of $R_s$ to which it is electrically connected at all times. The pneumatic cuff 16 is then bound around the arm of the subject and inflated to a pressure above systolic, so that the level of the mercury in the manometer 12 is driven to the top of the tube at a height of some 260 mm. above zero (atmospheric) pressure level. A potential is applied to the Wheatstone bridge at the junctions between $R_{Hg}$ and $R_c$ and between $R_a$ and $R_b$ by means of a switch 30. When the time axis motor 31 is energized the time axis motor rotates and the fraction of $R_s$ short-circuited by the contact 32 increases so that an initial balance of the bridge produced by proper proportioning of $R_{Hg}$ and $R_s$, $R_c$, $R_a$, and $R_b$ is upset, the sum of $R_s$ and $R_{Hg}$ declining from its original value. The condition of balance for the bridge is that $$R_s + R_{Hg} = \frac{R_a}{R_b} R_c$$

The condition for balance may be initially established by adjustment of $R_c$. The unbalance produced by decline in the value of $R_s$ is picked off the bridge at the junctions between $R_s$ and $R_a$ and between $R_b$ and $R_c$ and fed through a suitable high input impedance amplifier 60 of known type to a polarized relay 19 which, upon operating, opens the escape valve 11. The pressure in the pneumatic cuff 16 then falls and allows the height of the mercury column in the manometer to fall until a balance of the bridge is re-established by a growth of the value of $R_{Hg}$, whereupon the relay 19 is de-energized and the escape valve 11 closes. Since the relay 19 is polarized, unbalance of the bridge due to the sum of $R_s$ and $R_{Hg}$ being greater than the figure required for balance (too rapid fall of sphygmomanometer pressure) does not open the escape valve 11 and the time axis motor 31 continues to decrease the value of $R_s$ until the reduction in $R_s$ equals the growth in $R_{Hg}$. In this way the sum of $R_s$ and $R_{Hg}$ is maintained at all times substantially constant and equal to $$\frac{R_a}{R_b} R_c$$

whereby the bridge is maintained at all times in balance.

To any given value of $R_{Hg}$ there corresponds therefore only one value of $R_s$ for which the bridge will be in balance. As each value of $R_s$ corresponds to a single position of the contact 32 and hence of the pen 33 which is linked thereto, for any value of $R_{Hg}$, and hence for any value of sphygmomanometer pressure, there exists only one position of the pen 33 for which the bridge will be in balance. The bridge being self-balancing, each position of the pen 33 along the chart 34 is referable to a single value of sphygmomanometer pressure. The chart 34 is therefore calibrated in millimeters of mercury pressure from 0 to 260 along its lengthwise or time axis and the transverse oscillations graphically produced thereon by the auscultatory sounds are those occurring at the instant when the pressure within the cuff 16 was equal to the value indicated on the chart.

In order that the graphical record of auscultatory sounds may be a customary representation of sound amplitudes versus time, the speed of travel of the pen 33 along the chart 34 is made uniform. This is achieved by rotating the time axis motor 31 at a uniform rate.

Figure 3:
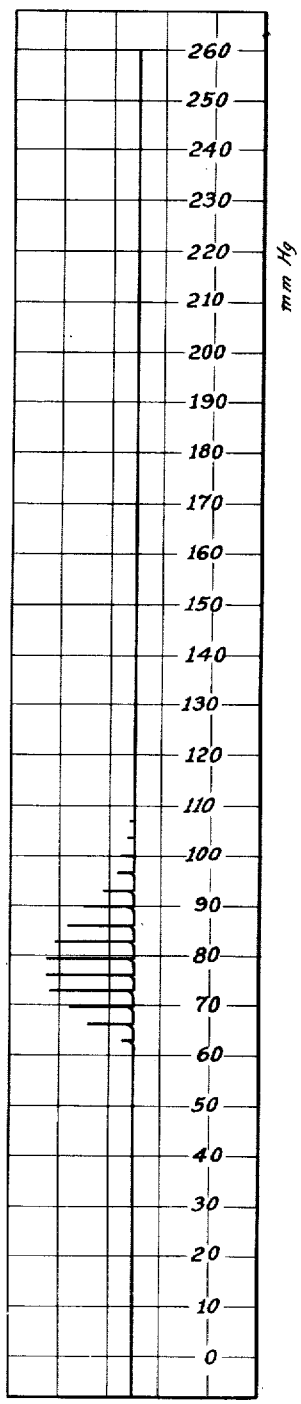
Fig. 3 is a typical graphical record of the envelope of the wave form of the auscultatory sounds in terms of the blood pressures occasioning them as the cuff pressure is reduced from a value above systolic to a value below diastolic.

The manner in which sphygmomanometer pressure varies with position of the pen 33 along the chart 34 depends on the variation in resistance of $R_{Hg}$ and $R_s$ along their length and upon the nature of the linkage between the contact 32 and the pen 33. It will usually be preferable to make this linkage one in which the motion of the contact 32 bears a constant ratio to the motion of the pen 33 along the time axis of the record chart 34, as indicated in Fig. 3. Although by suitable choice of the functions for resistance per unit length of $R_s$ and $R_{Hg}$ the sphygmomanometer pressure corresponding to points along the chart 34 can be made to vary according to any desired function, it is usually desirable for the sphygmomanometer pressure to be a linear function of position along the chart 34, so that the calibration of the chart may be linear. This is most easily achieved by providing both $R_{Hg}$ and $R_s$ with a constant resistance per unit length. In this way sphygmomanometer pressure will be a linear function of $R_{Hg}$ and the position of the contact 32 along the length of $R_s$ and hence of the pen 33 along the chart 34 will be a linear function of $R_s$. Since the sum of $R_s$ and $R_{Hg}$ is constant, the relation of sphygmomanometer pressure to the position of the pen 33 along the chart 34 will likewise be linear.

The ordering of the elements $R_{Hg}$ and $R_s$ among the legs of the Wheatstone bridge may of course be varied, as by making the condition for balance that they be proportional to each other. All that is necessary is to so connect the elements $R_s$ and $R_{Hg}$ that for each value of $R_{Hg}$ there is only a single value of $R_s$ for which the balance condition of the bridge is satisfied.

The speed of travel of the pen 33 along the time-pressure axis is chosen with regard for a desirable rate of fall of pressure in the cuff 16.

Fig. 3 shows a typical graphical record of the envelope of the wave form of the auscultatory sounds as the pressure in the cuff 16 is reduced from a value above systolic to a value below diastolic. This record was made with a relative speed of stylus and record chart along the time axis of the graphical record such as to compress into a convenient space the sounds occurring during a complete variation of cuff pressure beginning at a value above systolic and ending at a value below diastolic. The systolic and diastolic pressures may be readily read from the record by noting the pressures at which sounds begin and end as the pressure falls, or in accordance with such other criteria of initial and final sounds as may be adopted from the prior aural method using a stethoscope, or hereafter established. For the purpose of making a record such as that of Fig. 3, the frequency characteristic of the recording system from microphone to stylus is preferably proportioned to correspond to the frequency characteristic of the acoustic stethoscope normally used in taking blood pressure. The amplitudes of auscultatory sounds thus recorded correspond to the intensities heard when using the stethoscope in the normal manner. Further, by the insertion of filters proportioned to select desired bands of frequencies within the auscultatory spectrum, records may be made of such frequency aspects of the auscultatory sounds as are desired. Thus, in this use of the present invention it is in general desirable to employ a recording system which will exclude the inaudible pulse waves but which will include so much of the auscultatory sounds as are properly attributable to the compression of the artery and which are of assistance in forming a proper judgment of the events relied upon as a measure of the systolic and diastolic and intermediate pressures. These events include, for example, the first opening of the artery at the peak of the cardiac cycle as the applied pressure falls and the last closing of the artery at the minimum of the cardiac cycle when the applied pressure passes through the diastolic level.

Figure 4:
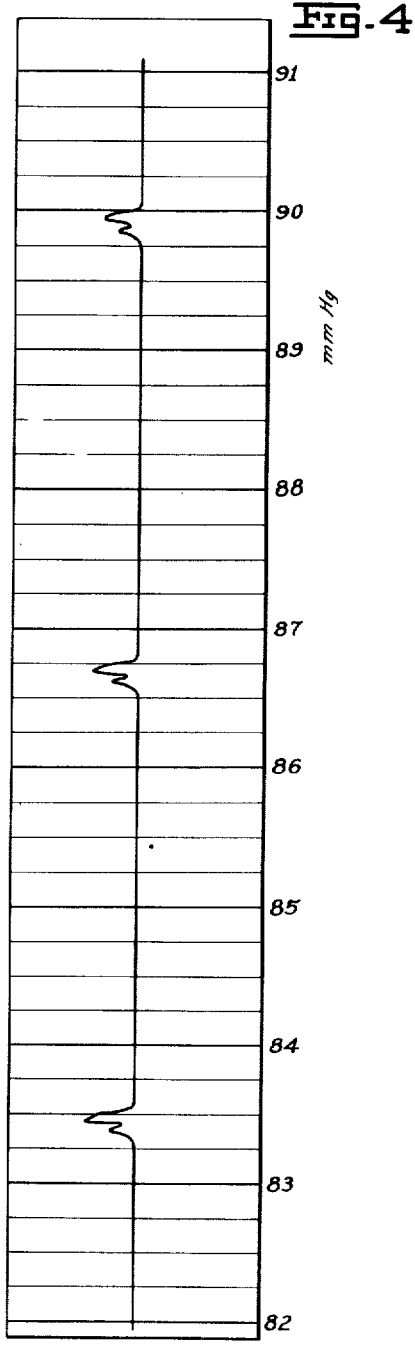
Fig. 4 is a typical record of the envelope of the wave form of a selected phase of the auscultatory sounds.

Fig. 4 indicates a typical record of the envelope of the wave form of a selected phase of the auscultatory sounds. As is the case with Fig. 3 the time axis of this record is calibrated in units of sphygmomanometer pressure, from which may be read the pressure occasioning or accompanying the corresponding sounds. A record of this type may be obtained by substituting for the rigid connection shown in Fig. 2 between the movable contact 32 and the pen 33 a gear train or other mechanical device which multiplies the distance through which the pen 33 moves over the distance through which the contact 32 moves by some convenient factor. In this way the peaks appearing in Fig. 3 are spread out on the record chart as shown in Fig. 4, so that the detail of the envelope of the wave form of the auscultatory sounds at various phases in the passage of cuff pressure from above systolic to below diastolic may be studied. In this instance the frequency characteristic of the recorder is adapted by design and additional filters to provide a broad and uniform response. Where it is desired to record the wave form of selected phases of an individual pulse, filters are employed to select the desired band of frequencies.

It should be understood that it is not desired to limit the present invention to the details of design and construction herein shown and described. The invention covers, for example, the use in the sphygmomanometer of an aneroid as well as a mercurial type of pressure-sensitive element from which are taken the pressure indications used to control the release of pressure within the sphygmomanometer. Other modifications and variations may be made within the scope of the appended claims.

I claim:

1. In combination a sphygmomanometer, a graphical recorder having a stylus and a record medium arranged for relative movement therebetween along an axis of said medium representative of time, means for applying to the recorder auscultatory sounds produced in the blood vessel of which the blood pressure is to be measured, and means for relating the escape of air from the sphygmomanometer to the relative movement of said stylus and said medium along the said axis representative of time so that the pressure within said sphygmomanometer will be a single-valued function of the position of said stylus along the axis representative of time, whereby said axis may be calibrated in units of sphygmomanometer pressure and the systolic and diastolic pressures may be read from the record in terms of auscultatory sounds which are characteristic thereof.

2. An improved sphygmomanometer comprising pneumatic means for applying pressure to a blood vessel, means for reducing the pressure within said pneumatic means according to a given function of time, means for producing a graphical record of the auscultatory sounds produced in said blood vessel during the said reduction in pressure so that the increments of space occupied on said record by the auscultatory sounds occurring in given increments of time are related to said increments of time according to the same function as that relating increments of pressure to the increments of time during which they occur, and means for initiating a graphical recording of said sounds commencing at a sphygmomanometer pressure above the systolic point and in synchronism with a controlled decrease in said initial pressure.

3. A recording sphygmomanometer comprising an inflatable cuff adapted for application to a human limb, means for regulating the inflation of said cuff so that the pressure therein varies as a linear function of time, a transducer for picking up and selecting the auscultatory sounds produced in the blood vessel of which the blood pressure is to be measured, a recorder adapted to receive energy from said transducer and to produce therefrom a graphical record representative of said sounds along a linear time axis calibrated in units of sphygmomanometer pressure, and means for initiating the recording of said sounds commencing at a sphygmomanometer pressure above systolic and in synchronism with the beginning of a controlled decrease in said sphygmomanometer pressure from a pressure equal to that indicated at the beginning of the record of said sounds, whereby the systolic and diastolic pressures may be directly read from the graphical record in terms of the auscultatory sound indications which are characteristic thereof.

4. A recording sphygmomanometer comprising an inflatable cuff adapted to be applied to a human limb, a variable resistor adapted to be varied according to a given function of time, a second variable resistor adapted to be varied according to a given function of the pressure within the said cuff, a Wheatstone bridge embodying as elements the two said variable resistors, means actuated by the voltage provided from the unbalance of the said bridge for controlling the said pressure whereby the said pressure is caused to vary according to a given function of time, a recorder having a stylus and a record medium arranged for relative movement therebetween along an axis of the said medium according to a given function of time, means for supplying to said recorder the auscultatory sounds produced during the course of a blood pressure measurement, and means to initiate the recording of said sounds at a predetermined value of said pressure, whereby each point along the time axis of the graphical record of said sounds will be referable to a single value of said pressure.

5. An improved sphygmomanometer comprising a pneumatic cuff adapted for application to a human limb, a variable resistor adapted to be varied according to a given function of time, a second variable resistor adapted to be varied according to a given function of the pressure within the said cuff, a Wheatstone bridge embodying as elements the two said variable resistors, and means actuated by the voltage provided from the unbalance of the said bridge for controlling the pressure within the said cuff, whereby the said pressure is caused to vary according to a given function of time.

6. A recording sphygmomanometer comprising pneumatic means for applying pressure to a blood vessel, a transducer for deriving energy from the auscultatory sounds produced in the blood vessel of which the blood pressure is to be measured, a recorder including a stylus and a record medium arranged for relative movement therebetween along an axis of said medium representative of time and arranged for relative movement transversely to said axis in response to energy supplied by said transducer so as to produce a graphical record representative of the said auscultatory sounds, and means linking the relative movement of said stylus and said medium along said axis representative of time to the pressure within said pneumatic means, whereby the position of said stylus along said axis representative of time is a single-valued function of the said pressure.

7. An improved sphygmomanometer comprising pneumatic means for applying pressure to a blood vessel and, means for controlling the escape of air from said pneumatic means so as to cause the pressure therewithin to vary according to a prechosen function of time independently of changes in volume and shape impressed upon said pneumatic means by the flow of blood within in the said blood vessel.

8. In combination, a sphygmomanometer, an electrically actuated recorder having a recording stylus, said recorder being operatively associated with said sphygmomanometer, chart means bearing indices of sphygmomanometer pressure arranged along its time axis and adapted for use in said recorder, means for initiating relative movement of the stylus and the chart along the time axis of said chart at a sphygmomanometer pressure above systolic, and means for continuously controlling the decrease of pressure within the said sphygmomanometer from said pressure above systolic to below the diastolic pressure proportionately to the movement of said stylus along the time axis of said chart, whereby a permanent visible trace-record of the auscultatory sounds is produced on said chart from which the systolic and diastolic pressures may be read.

9. A combined automatically-operated sphygmomanometer and graphical recorder comprising a sphygmomanometer of the mercurial manometer type, a recorder having a stylus and a record medium bearing indexes of sphygmomanometer pressure along an axis thereof, said stylus and record medium being arranged for relative translation along said axis according to a given function of time, a variable resistor adapted to be varied in value according to a given function of the translation of said stylus relative to said record medium, a second variable resistor adapted to be varied in value according to a given function of the pressure within the said sphygmomanometer, a Wheatstone bridge embodying as elements the two said variable resistors, and means actuated by the voltage provided from the unbalance of the said bridge for controlling the release of pressure within the said sphygmomanometer, whereby the sphygmomanometer pressure is caused to vary according to a given function of the position of said stylus along the time axis of said record medium and the systolic and diastolic pressures may be read directly from the trace thereon.

10. A combined automatically operated sphygmomanometer and graphical recorder comprising a mercurial manometer, an inflatable cuff for application to a human limb connected to said manometer, an electrical resistor arranged in a column of said manometer, a second electrical resistor having a movable contact, said resistors being arranged in Wheatstone bridge arm electrical relationship, an electrically actuated graphical recorder having a stylus and a record medium adapted to be moved relative to each other in translation, said record medium being calibrated in units of sphygmomanometer pressure and arranged in operative relation with said stylus during relative motion therebetween, means producing motion of said stylus relative to said record medium and of said contact relative to said second resistor at uniform rates, means for controlling the air pressure escape valve of the sphygmomanometer to deflate the cuff and thus reduce the pressure applied to a human artery in accordance with the relative resistance values of the said arms of the Wheatstone bridge, means for deriving electrical pulses corresponding to the auscultatory sounds produced in the said artery, and means for applying said electrical pulses to said recording stylus, whereby a permanent graphical representation of the auscultatory sounds at the systolic and diastolic and intermediate points is produced on said chart along a time axis readable in units of sphygmomanometer pressure.

11. The method of automatically operating a sphygmomanometer and simultaneously recording graphically the auscultatory sounds at the systolic and diastolic and intermediate points which comprises operatively associating with the sphygmomanometer an electrically-actuated recorder having a recording stylus, providing for use in said recorder a chart calibrated in sphygmomanometer pressure along its time axis, initiating movement of said stylus relative to said chart along the time axis of said chart at a sphygmomanometer pressure above systolic, and continuously controlling the release and decrease of pressure within the sphygmomanometer from above the systolic point to below the diastolic point proportionately to the movement of the said stylus along the time axis of said chart, whereby a permanent trace-record of the auscultatory sounds is produced on said chart from which the systolic and diastolic pressures may be read.

12. The method of automatically operating a mercurial manometer sphygmomanometer and simultaneously producing a graphical record of the auscultatory sounds at the systolic and diastolic points which comprises arranging a resistor in the mercury column of the manometer, disposing a second resistor with a movable contact in Wheatstone bridge arm electrical relationship with said first resistor, providing an electrically actuated graphical recording stylus and sphygmomanometer pressure calibrated chart in operative relation for relative movement, moving said stylus relative to said chart and said movable contact at a uniform rate, controlling the air pressure escape valve of the sphygmomanometer to deflate the cuff thereof and thus reduce the pressure applied to a human artery in accordance with the relative resistance values of the said arms of the Wheatstone bridge, producing electrical pulses corresponding to the auscultatory sounds produced in the said artery, and actuating said stylus by the said electrical pulses, whereby a permanent graphical record of the character and amplitudes of the auscultatory sounds at the systolic and diastolic points is produced on the said chart along a time axis readable in units of sphygmomanometer pressure.

13. The method of measuring and recording blood pressures which comprises reducing the pressure within a sphygmomanometer while operatively applied to a subject according to a first known and reproduceable function of time and producing a graphical record of the auscultatory sounds produced during the course of the said reduction in pressure by means of a recording stylus moved according to a second known and reproduceable function of time relative to a record chart so as to define a time axis thereon, whereby each point along said time axis is referable to a single value of sphygmomanometer pressure.

14. In apparatus for measuring and recording blood pressures including a sphygmomanometer, a transducer for deriving energy from the auscultatory sounds produced during the course of a blood pressure measurement, and a recorder for producing from said energy a graphical record of said sounds by the translation of a stylus relative to a record chart, the method of automatically recording blood pressures which comprises linking the reduction in sphygmomanometer pressure to the translation of said stylus along an axis of said chart representative of time according to a single-valued function, so that each point on said record chart corresponding to a given value of said time axis will be referable to a single value of sphygmomanometer pressure.

15. The method of operating a blood pressure measuring and recording apparatus including a sphygmomanometer and an electrically actuated recording stylus movable relative to a record chart which comprises translating the auscultatory sounds produced during the course of a blood pressure measurement into corresponding electrical currents, applying said currents to the recording stylus to produce on the record chart a graphical record of the auscultatory sounds, and simultaneously producing a relative movement between the recording stylus and the chart along an axis of coordinates of said chart representative of time in controlled synchronism with the reduction in the sphygmomanometer pressure, whereby points on the graphical record produced on said chart are referable to values of sphygmomanometer pressure.

16. Blood pressure measuring and recording apparatus comprising a sphygmomanometer, a transducer for deriving from the auscultatory sounds produced during the course of a blood pressure measurement electric currents corresponding to said sounds, a recording stylus, a record chart having an axis representative of time, means to simultaneously advance the stylus relative to the chart along the time axis thereof according to a known function of time and to reduce the pressure in the cuff according to a known function of time, and means to energize the stylus by the said currents.

CLAIR L. FARRAND.

REFERENCES CITED

The following references are of record in the file of this patent:

UNITED STATES PATENTS

| Number | Name | Date |
| --- | --- | --- |
| 1,686,504 | Dodge | Oct. 2, 1928 |
| 2,272,836 | Gardien | Feb. 10, 1942 |
| 2,379,573 | Gilson | July 3, 1945 |

FOREIGN PATENTS

| Number | Country | Date |
| --- | --- | --- |
| 574,873 | Germany | Apr. 21, 1933 |

Certificate of Correction

Patent No. 2,571,124 October 16, 1951

CLAIR L. FARRAND

It is hereby certified that error appears in the printed specification of the above numbered patent requiring correction as follows:

Column 3, line 75, after "rate of" insert *fall of*; column 10, line 36, after "means" insert *for*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*